United States Patent [19]

Kucera

[11] Patent Number: 4,747,357
[45] Date of Patent: May 31, 1988

[54] MINI SEEDER

[76] Inventor: Bozena Kucera, 12446 Hodges, Houston, Tex. 77085

[21] Appl. No.: 856,799

[22] Filed: Aug. 15, 1986

[51] Int. Cl.$^4$ .............................................. A01C 7/02
[52] U.S. Cl. ........................................ 111/82; 111/92
[58] Field of Search ............... 111/82, 92, 4, 92.1, 111/94, 95

[56] References Cited

U.S. PATENT DOCUMENTS

| 128,384 | 6/1872 | Gibbs | 111/92 X |
| 202,593 | 4/1878 | Shew | 111/95 |
| 693,716 | 2/1902 | Jervis | 111/92 |
| 1,078,165 | 11/1913 | Priset | 111/92 |
| 1,298,134 | 3/1919 | Wilson | 111/92 |
| 1,439,601 | 12/1922 | Boop | 111/92 |
| 1,916,781 | 7/1933 | Blatchford | 111/82 |
| 2,171,037 | 8/1939 | Mahukin | 111/92 |
| 2,248,176 | 7/1941 | Johnson | 111/92 |
| 2,652,012 | 9/1953 | Ischinger | 111/92 |
| 2,857,864 | 10/1958 | Cromer | 111/95 |
| 2,860,586 | 11/1958 | Nozell | 111/92 |
| 2,865,315 | 12/1958 | Goldstein | 111/92 |
| 3,126,847 | 3/1964 | Morris | 111/92 X |
| 4,011,612 | 3/1977 | Atkinson | 111/92 X |
| 4,218,981 | 8/1980 | Kelly | 111/92 X |

FOREIGN PATENT DOCUMENTS

| 0896473 | 2/1945 | France | 111/82 |
| 595084 | 6/1959 | Italy | 111/92 |
| 608715 | 9/1960 | Italy | 111/92 |
| 353091 | 7/1931 | United Kingdom | 111/82 |
| 583234 | 12/1945 | United Kingdom | 111/82 |

Primary Examiner—Robert A. Hafer
Assistant Examiner—Danton D. DeMille
Attorney, Agent, or Firm—Michael P. Breston

[57] ABSTRACT

The mini seeder comprises an open receptacle which has a rim and a top surface provided with a seed discharge orifice. A substantially U-shaped partition around the orifice divides the top surface into a seed-transfer channel within the partition, and a seed-storage area which is externally of the partition. A discharge-and-guide tube extends downwardly from the orifice. A boss surrounds the lower end of the tube. A nearly semi-cylindrical tine outwardly-projects from the lower end of the boss.

1 Claim, 1 Drawing Sheet

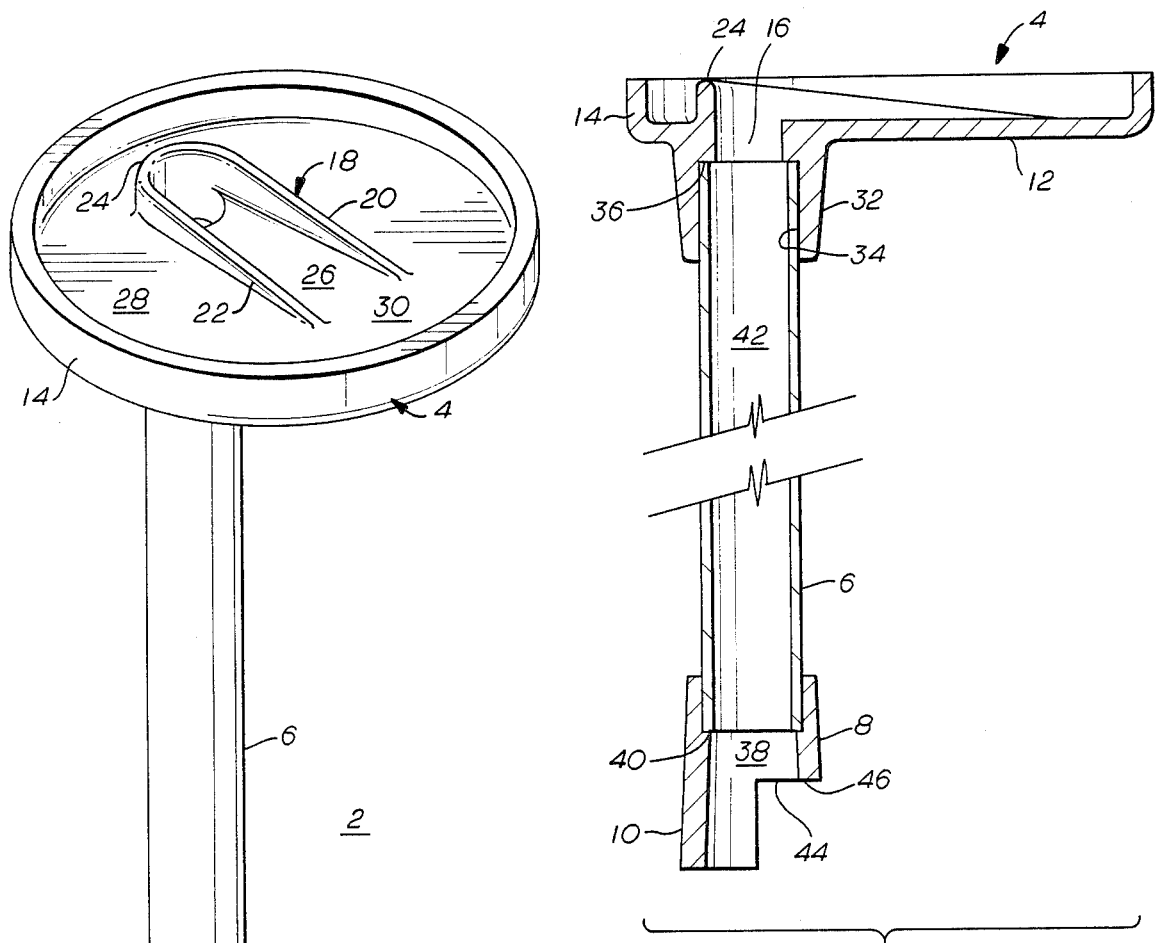
FIG. 2
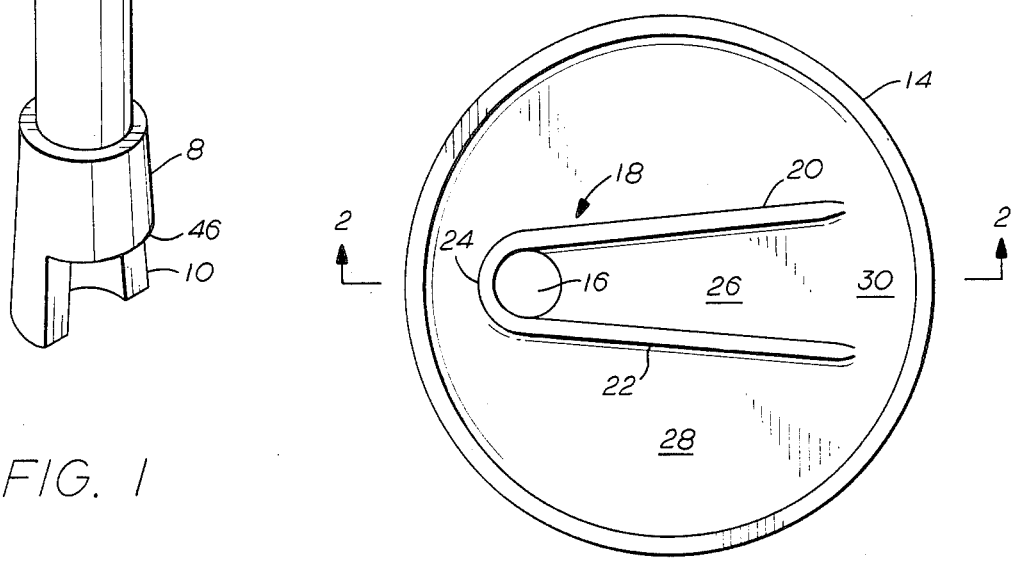
FIG. 1
FIG. 3

MINI SEEDER

FIELD OF THE INVENTION

This invention relates to hand-operated mini seeders for selectively separating, dispensing and directing to a desired soil location seeds that are difficult to manipulate individually due to their very tiny size.

BACKGROUND OF THE INVENTION

The selection, separation and sowing of tiny seeds is now being performed manually. This is a tedious, backbreaking, and time-consuming procedure, which usually also involves involuntarily sowing multiple seeds instead of one per hole. Such a troublesome procedure is wasteful of expensive seeds. It also results in the growth of undesired multiple plants that require pruning. Also, after manually dropping a tiny seed into the furrow, it becomes invisible and therefore cannot be properly covered with the required soil layer, typically ⅛" in thickness.

Most known mechanical seeders have a funnel tube tapered into a spike adapted to penetrate into the soil. Experience shows that the spike frequently becomes plugged up with soil and must be unplugged. The known seeders are for relatively larger seeds, such as corn and the like, and they cannot be readily adapted for sowing very tiny seeds. They require manual seed handling which is not very practical mainly because the selection, separation and propulsion of very tiny seeds cannot be done with a finger. When a finger touches a mass of seeds, it attracts several of them, especially under humid conditions, and for that reason individual seed planting is virtually impossible. Also, if a tiny seed were to be dropped through the funnel's spike into the soil, it would become deposited too deep and at the bottom of the hole made by the spike. Such a seed is likely to rot.

Thus, because the known prior art seeders are not capable of dealing with the problems created when sowing tiny seeds, there has been a long-felt need for a seeder which would allow to sow mini seeds, one at a time, very close to and underneath the earth's surface, and to space them a uniform distance apart in the furrow in order to grow rows of individual plants that are substantially uniformly spaced apart.

Accordingly, it is a main object of this invention to provide a new and unique approach to solving mini seed sowing problems which, although heretofore recognized, have not been effectively addressed.

It is a further object to provide a simple, and yet very effective mini seeder, which is relatively inexpensive to manufacture, which is simple to use, and which allows to selectively separate, dispense, and direct to a desired soil location a single tiny seed.

SUMMARY OF THE INVENTION

The hand-operated mini seeder is adapted for selectively separating, dispensing and consecutively directing tiny seeds to a desired soil location. It comprises an open receptacle having a base and a surrounding rim. The base has a substantially-flat top surface for holding seeds therein. The base has a seed-discharge orifice therethrough. A substantially U-shaped partition around the orifice divides the top surface of the base into a constricted, seed-transfer channel extending between the inner walls of the partition, and a seed-storage surface extending between the rim and the external walls of the partition. An elongated discharge-and-guide tube extends downwardly from the orifice. A boss surrounds the lower end of the tube, and the boss has an open chamber which is coaxial with the bore of the tube. An approximately semi-cylindrical tine outwardly-projects from the lower end of the boss. The tine is adapted to penetrate into a selected spot in the soil in which a seed is to be planted and to help maintain the tube and the receptacle in a fixed position above the spot.

BRIEF DESCRIPTION OF THE DRAWINGS

FIG. 1 is a perspective view in elevation of the novel mini seeder embodying the features of the present invention;

FIG. 2 is a longitudinal sectional view taken on line 2—2 in FIG. 3; and

FIG. 3 is a top view of the mini seeder shown in FIG. 1.

DESCRIPTION OF A PREFERRED EMBODIMENT

With reference to the drawings, the preferred embodiment of the novel mini seeder, generally designated as 2, comprises an open receptacle 4, a guide tube 6, and a boss 8 having a tine 10.

Receptacle 4 is adapted to hold a quantity of very tiny seeds of different sizes and shapes that are intended to be dispensed therewith. Receptacle 4 has a circular or elliptical section, and comprises a base 12, a cylindrical rim 14, an off-center orifice 16, which is surrounded by a generally U-shaped partition 18. Partition 18 has side walls 20, 22 and an arcuate base 24 around orifice 16. From orifice 16 the upper edges of side walls 20,22 taper downwardly. Partition 18 divides the top flat surface of base 12 into a seed-transfer channel 26 within partition 18, a seed-storage surface 28 externally of and around partition 18, and a transition surface 30 between rim 14 and the entrance to transfer channel 26.

Underneath base 12 and below orifice 16 downwardly extends a neck 32 having a cylindrical chamber 34 which tightly receives the upper end of tube 6 that abuts against an annular shoulder 36. Boss 8 has a longitudinal chamber 38 which tightly receives the lower end of tube 6 that abuts against an annular shoulder 40.

Upright, seed-discharge, guide tube 6 has a bore 42. Chamber 38 has a seed-discharge port 44, and boss 8 ends with a semi-annular, flat, stop flange 46. Tine 10 is nearly semi-cylindrical and is continuous with boss 8. Bore 42 of guide tube 6 is slightly larger than orifice 16, but it is slightly smaller than the diameter of chamber 38, so that a seed can fall downwardly through bore 42 without any interference from sharp edges.

In operation, the user stands erect and comfortably grasps with one hand neck 32, while with her other hand she dumps a quantity of seeds into receptacle 4 over external surface 28. By slightly shaking receptacle 4 in a horizontal plane, some of the seeds will arrange themselves adjacent to partition 18 whose sides 20,22 will block the further movement of the seeds that come in contact therewith, and some seeds will advance toward transition surface 30 and from there move into seed transfer channel 26.

To start the seeding operation, tine 10 is pushed into the prepared soil. But because tine 10 is thick in section, its penetration into the soil is slow and is stopped by flange 46, thereby preventing loose soil from filling up chamber 38 and thereby blocking the seeding.

A single seed from channel 26 can now be positively propelled with the nail of a finger, or preferably with the aid of the tip of an implement, such as the eraser of a pencil (not shown). The eraser is placed over a single seed and with a gentle push is made to slide or roll over transfer channel 26 in a substantially straight line down to the seed-releasing orifice 16. The remaining seeds on transfer channel 26 will not be disturbed and will not follow the selected seed in its movement with the eraser. The thusly propelled seed falls into bore 42 of guide tube 6 and drops out from exit port 44 and becomes deposited on top of the underlying soil in the furrow.

After tine 10 is pulled out from the soil, it leaves a visible mark which allows the user to cover it up with a thin layer of soil according to sowing instructions, usually ⅛" or less in thickness.

While maintaining receptacle 4 nearly horizontal, the user is now ready to guide mini-seeder 2 along the furrow and repeat the above described seeding procedure with regularity and reliability, that is, one seed from channel 26 will be pushed forward to orifice 16 and will pass therethrough, drop into and through directing tube 6, and will be discharged from port 44 on top of the underlying soil.

It will be appreciated that a continuous, uninterrupted storage and conveying surface is thus provided from external surface 28 through surface 3, channel 26, and through orifice 16 into guide tube 6. Thus, channel 26 serves as a constricted guide channel for controlling the sorting of tiny seeds from the mass of seeds on top of surface 28, and for isolating individual seeds for propulsion through exit port 44.

The complete sowing can be accomplished with little effort, with increased accuracy, in a minimum of time, and with practically no loss of expensive seeds.

This compact novel seed planter 2 is simple and inexpensive to construct out of tough plastic material, has a minimum number of durable parts, is light in weight, and is easy and efficient to operate.

What I claim is:

1. A hand-operated mini seeder for selectively separating, dispensing and consecutively directing tiny seeds to a desired soil location, comprising:

an open receptacle having a base and a cylindrical rim around said base; said base having a generally flat top surface and an off-center, seed-discharge orifice; a generally U-shaped partition extending upwardly from said top surface, said partition having an arcuate wall portion around said orifice and a pair of side walls extending toward and ending near said rim, whereby said partition divides said top surface into a seed-transfer channel situated between said side walls and encompassing said orifice, and the remainder of said top surface serving, in use, as a seed storage area;

an elongated seed-discharge tube having a longitudinal bore, said tube extending downwardly from said base and being coaxial with said orifice;

a boss surrounding the lower free end of said tube; and a substantially semi-cylindrical tine extending downwardly from said boss, whereby in use, said tine is adapted to penetrate into the soil until said boss is near the top of the soil, said storage area receives a quantity of tiny seeds thereon, said receptacle is slightly shaken to allow a few seeds to become lodged within said channel, and each seed is then individually propelled from said channel toward said orifice, down said tube, and becomes deposited on top of the underlying soil near said tine.

* * * * *